United States Patent Office 2,802,035
Patented Aug. 6, 1957

2,802,035
2-CHLOROETHYL ALKYL SULFONES
John K. Fincke, San Jose, Calif., assignor to Monsanto Chemical Company, St. Louis, Mo., a corporation of Delaware No Drawing. Application April 22, 1954,
Serial No. 425,041

6 Claims. (Cl. 260—607)

The present invention relates to organic compounds of sulfur and methods of preparing the same and more particularly provides certain new and valuable sulfones. According to the invention there are prepared alkyl 2-chloroethyl sulfones having from 8 to 20 carbon atoms in the alkyl radical by the oxidation of corresponding alkyl 2-chloroethyl sulfides.

As examples of sulfones provided by the present invention may be mentioned: 2-chloroethyl octyl sulfone, 2-chloroethyl 2-ethylhexyl sulfone, 2-chloroethyl isononyl sulfone, 2-chloroethyl n-decyl sulfone, 2-chloroethyl undecyl sulfone, 2-chloroethyl tetra-dodecyl sulfone, 2-chloroethyl tridecyl sulfone, 2-chloroethyl tetradecyl sulfone, 2-chloroethyl hexadecyl sulfone, 2-chloroethyl octadecyl sulfone, and 2-chloroethyl eicosyl sulfone.

The present 2-chloroethyl alkyl sulfones are readily prepared by contacting the appropriate 2-chloroethyl alkyl sulfide with hydrogen peroxide at ordinary or increased temperatures and in the presence of an inert solvent or diluent. Advantageously, reaction is effected in the presence of an unreactive solvent medium such as glacial acetic acid, dioxane, acetone, methyl ethyl ketone, etc., and temperatures of from, say, 50° C. to the refluxing temperature of the reaction mixture are used.

The present 2-chloroethyl alkyl sulfones are well-defined stable compounds which range from viscous liquids to crystalline solids. They may be advantageously employed for a variety of industrial and agricultural purposes. They are particularly valuable for the preparation of 2-(alkylsulfonyl)ethyl-substituted quaternary nitrogen compounds of high utility as herbicides as described in my U. S. Patent No. 2,657,988, issued November 3, 1953. In the preparation of said herbicidally active quaternary nitrogen compounds the present 2-chloroethyl alkyl sulfones undergo an addition reaction with heterocyclic nitrogen compounds of the pyridine series such as pyridine, quinoline, isoquinoline, 2-methyl-5-ethyl pyridine, lepidine, α-picoline etc. The invention is further illustrated, but not limited, by the following examples.

*Example 1*

2-chloroethyl n-octyl sulfide (15.0 g.) was dissolved in 100 cc. of glacial acetic acid and 20 cc. of 30% aqueous hydrogen peroxide was gradually added to the resulting solution. After initial exothermal reaction had subsided, the reaction mixture was heated on the steam bath for 30 minutes and allowed to stand overnight at room temperature. It was then poured into an excess of water, neutralized with sodium hydroxide and extracted with ether. The ether was separated from the extract by evaporation and the residue was crystallized from methanol to give 10.0 g. (approximately 80.0% theoretical yield) of the substantially pure β-chloroethyl n-octyl sulfone M. P. 41.5–53.0° C., and analyzing as follows:

| | Found | Calcd. for $C_{10}H_{21}ClO_2S$ |
|---|---|---|
| Percent C | 49.51 | 50.0 |
| Percent H | 8.68 | 8.73 |
| Percent Cl | 14.88 | 14.72 |
| Percent S | 13.4 | 13.3 |

*Example 2*

Operating exactly as in Example 1 but employing 2-chloroethyl n-decyl sulfide instead of the 2-chloroethyl n-octyl sulfide of Example 1, there was obtained a 74% theoretical yield of 2-chloroethyl n-decyl sulfone, M. P. 56–57° C.

*Example 3*

To a solution of 70.0 g. of 2-chloroethyl n-dodecyl sulfide in 200 cc. of glacial acetic acid there was gradually added 90 cc. (0.8 mole) of 30% aqueous hydrogen peroxide. After the initial reaction had subsided, the reaction mixture was heated at 100° C. for about 30 minutes. The resulting reaction mixture was then cooled to 40° C. at which point crystallization occurred. After the crystals were well formed, 600 cc. of distilled water was added to the reaction mixture and the resulting precipitate washed with two 100 cc. portions of water, pressed dry and then dried overnight in a vacuum oven at 50° C. There was thus obtained 80 g. (approximately 100% theory) of the white crystalline 2-chloroethyl n-dodecyl sulfone M. P. 60–61° C. Recrystallization from ethanol gave a pure product M. P. 62.5–63.0° C. and analyzing as follows:

| | Found | Calcd. for $C_{14}H_{29}ClO_2S$ |
|---|---|---|
| Percent Cl | 11.96 | 11.94 |
| Percent S | 10.68 | 10.78 |

*Example 4*

A solution of 20.0 g. of 2-chloroethyl tert-tetradecyl sulfide in 50 cc. of glacial acetic acid was gradually treated with 20 cc. of 30% aqueous hydrogen peroxide. After the initial exothermal action had subsided it was heated to reflux and then allowed to cool. The cooled reaction mixture was diluted with 250 cc. of water and extracted with three 50 cc. portions of ether, dried over sodium sulfate and filtered. The ether was evaporated from the filtrate by heating at a temperature of 80° C. and a pressure of 2 mm. of mercury for 2 hours. There was thus obtained as residue 16.6 g. of the dark viscous liquid 2-chloroethyl tert-tetradecyl sulfone $n_D^{25}$ 1.4857.

*Example 5*

2-chloroethyl n-octadecyl sulfide (40.0 g.) was dissolved in 300 cc. of hot glacial acetic acid and to the solution there was gradually added, with stirring, 39.0 cc. of 30% aqueous hydrogen peroxide. The whole was then heated to boiling and allowed to cool to room temperature. Upon adding 250 cc. of water to the cooled mixture the product was precipitated. The precipitate was filtered, pressed dry and recrystallized from hot absolute ethanol to yield, after overnight air drying, 35 g. of the substantially pure 2-chloroethyl n-octadecyl sulfone, M. P. 80–82° C.

What I claim is:
1. A 2-chloroethyl alkyl sulfone having from 8 to 20 carbon atoms in the alkyl radical.
2. 2-chloroethyl octyl sulfone.
3. 2-chloroethyl decyl sulfone.
4. 2-chloroethyl dodecyl sulfone.
5. 2-chloroethyl tetradecyl sulfone.
6. 2-chloroethyl octadecyl sulfone.

References Cited in the file of this patent

Brown et al.: J. Chem. Soc. (1946), pp. 816–819.
Goldsworthy et al.: J. Chem. Soc. (1948), pp. 2177–2179.

UNITED STATES PATENT OFFICE
CERTIFICATE OF CORRECTION

Patent No. 2,802,035

John K. Fincke

August 6, 1957

It is hereby certified that error appears in the printed specification of the above numbered patent requiring correction and that the said Letters Patent should read as corrected below.

Column 1, line 64, for "41.5-53.0° C.," read -- 41.5-43.0° C., --.

Signed and sealed this 17th day of December 1957.

(SEAL)

Attest:
KARL H. AXLINE
Attesting Officer

ROBERT C. WATSON
Commissioner of Patents